Figure 1:
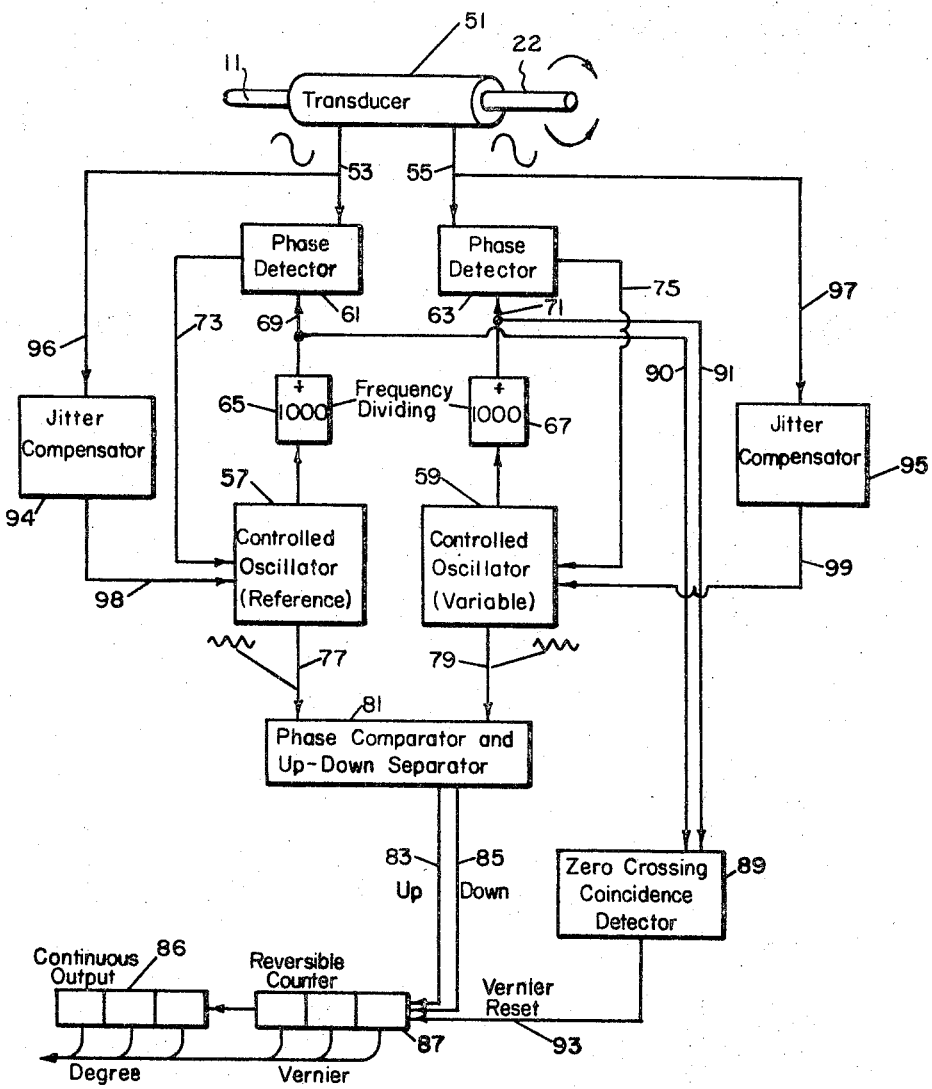

INVENTOR:
RICHARD C. WEBB
BY
Merriam, Smith, & Marshall.
Attorneys

United States Patent Office 3,312,903
Patented Apr. 4, 1967

3,312,903
JITTER COMPENSATING CIRCUIT FOR ANGLE ENCODING APPARATUS
Richard C. Webb, Broomfield, Colo., assignor, by mesne assignments, to International Telephone and Telegraph Corporation, New York, N.Y., a corporation of Maryland
Original application Mar. 4, 1959, Ser. No. 797,264, now Patent No. 3,152,324, dated Oct. 6, 1964. Divided and this application Jan. 8, 1963, Ser. No. 250,185
1 Claim. (Cl. 328—127)

This invention is a division of application, Ser. No. 797,264, filed Mar. 4, 1959, now U.S. Patent No. 3,152,324 assigned to the assignee of this invention. The invention relates to jitter compensating circuit use with apparatus and circuitry used for the obtainment of a continuous measurement and digital encoding of the relative phase difference between two substantially sinusoidal electrical signals of equal frequency but variable phase angle.

In its preferred form, the invention finds a principal application in the digital encoding of the relative phase difference between two electrical signal waves generated under the control of a precision electrostatic shaft-position-transducer which may be, illustratively, of the form described by this applicant in United States patent application Ser. No. 578,853, filed Apr. 17, 1956, now U.S. Patent No. 2,930,033. The transducer in its preferred form is a generator of two sinusoidal electrical signals of known and selected frequency, normally identical and one of which is of "reference" phase while the other adjusts to an advanced or retarded phase position in proportion to angular movements imparted to the mechanical shaft. Some phase measuring devices of the above type are designed to produce an electrical phase shift of precisely 360 electrical degrees for each mechanical degree of mechanical movement. By this invention a continuous electronic phase angle encoder is used in conjunction with an angle transducer to provide an apparatus by which angular positions of a shaft are interpreted in terms of digital signals with an accuracy considerably greater than that achieved by methods heretofore known or suggested.

The techniques embodied in this invention avoid the need for sampling of the analog information to be encoded into digital form, as is common in many analog-to-digital encoding schemes, so that the digital information is continuously available from the electronic apparatus and there is no delay entailed in the acquisition of information, as has been inherent in encoders of earlier designs.

According to the principles of this invention a large number of applications for shaft encoding apparatus of high precision manifest themselves. Such applications, by way of example, may be in the continuous measurement of azimuth and elevation shafts in optical tracking instruments and radars employed in guided missile range instrumentation; the measurement of angular displacements of stable platforms, the registration of angular settings of rotary tables used in machine tool applications, as well as many other applications that will suggest themselves to those skilled in the art to which the invention is directed.

The broad principle involved in the electrical phase angle measuring disclosed by the invention herein to be set forth is that of first relating each of the two signals whose relative phase is to be measured to selected harmonics of sufficiently high order to permit the harmonic frequencies to be used as a time measuring scale of fractional portions of the basic or fundamental signals.

In accordance with the invention and that preferred form of it herein to be particularly discussed, the one-thousandths harmonic of a given wave is used as a scale, which permits making measurements to a least count or granularity of $\frac{1}{1000}$ of a wavelength or 0.360 electrical degree. As the invention will herein be described, each of the two basic signals is related to a selected harmonic of the same order (the one-thousandth harmonic, for example) and these harmonic signals are applied to a summing circuit wherein they are permitted to interfere constructively and destructively (additively and subtractively) with one another in accordance with movements or shifts in the relative phase position of the basic signals. In a case where the related signals are chosen as the one-thousandth harmonic, one thousand interference maxima and minima will occur as the basic electric waveforms are shifted in phase by one wavelength. If this amount of electrical shift is produced by a shaft position transducer due to rotation through one mechanical degree, then a summation of interference maxima is a measure to one-thousandth part of a mechanical degree or increments of 3.6 sec. of arc.

In the event the mechanical shaft is rotated first in one direction and then in the other, that is, for instance, clockwise and counter-clockwise, it becomes necessary to register the number of "up" counts (as for an increasing phase change) as well as the number "down" counts (as, for instance, for a decreasing phase change) to maintain the latest information concerning the shaft setting. One part of this invention relates to an "up-down" separator which functions in conjunction with the interference detector to transmit a series of "up" counts over a signal channel to a digital counter, as well as a series of "down" counts over another signal channel to the same counter, the counter being one of a type adapted to be advanced by "up" counts and retarded by "down" counts, thereby retaining at all times a "net" count at any given instant.

Mechanical transducers of the foregoing type, even when made to the ultimate limit of mechanical perfection, inherently introduce amplitude and phase perturbations in the two basic signals derived therefrom. These mechanical imperfections result in a so-called "jitter" in the produced results unless compensated but by this invention they are minimized and substantially compensated for by purely electrical means according to the circuitry herein to be described. The mechanical transducers simultaneously produce both the amplitude and phase components of the mechanical perturbation. Fortunately, only the phase errors register in the electronic encoding apparatus which is substantially insensitive to amplitude disturbances. Accordingly, it becomes possible to amplitude demodulate the perturbation wave to produce a signal voltage that is substantially a replica of the disturbance. This invention provides for recovering such a voltage which is then introduced into an appropriate electrical phase-locking circuit to be used to tie the high frequency harmonic to its base signal in such a manner as to introduce a counter-perturbation into the phase-locking circuit in such a way as to oppose the natural perturbation coming directly from the phase modulation of the base signal. The combined effect is a neutralization of the disturbance.

This application is directed particularly to the electrical circuitry by which the "jitter," as above defined, is compensated. The invention and circuitry here disclosed provide a suitable control to aid in displaying, with greatly improved accuracy, decimal displays of mechanical conditions in an angle measuring assembly. In this respect, the invention is illustrated in a preferred form by the accompanying drawings which schematically show the complete operation of the circuitry and such associated components as are considered necessary to a full understanding of what is involved.

With the foregoing in mind it becomes apparent that one of the many objects of the invention is that of eliminating jitter in systems which inhibit and record the angular position of a monitored device.

Figure 2:
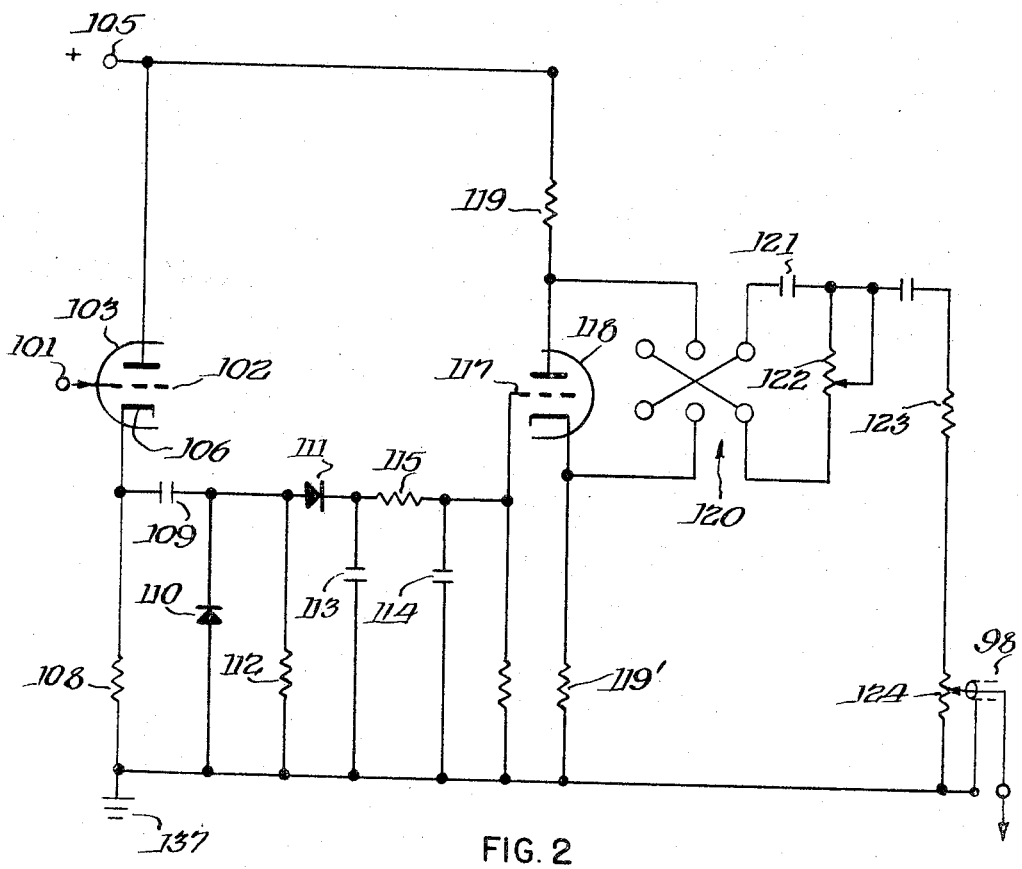

Other and further objects and advantages of the invention are set out by the parent application above identified and still other objectives will become apparent and at once suggest themeselves to those skilled in the art to which the invention is directed in the following description as considered particularly in connection with the accompanying drawings wherein:

FIG. 1 is a diagrammatic view presented to show in block diagram form the component parts of a phase comparison system using the inventive "jitter" compensator; and FIG. 2 is a circuit diagram of a "jitter" compensating circuit for compensating for changes in the generated wave forms.

For the purpose of illustrating the present invention in one of its aspects FIG. 1 shows, for instance, that an electro-mechanical transducer 51 provides the wave generating mechanism and that regardless of the built-in mechanical precision certain changes produce slowly fluctuating amplitude of the generated voltage waves. This transducer has a driven shaft element 11 which is turned continuously and uniformly at as constant a speed as possible by means of a suitable driving motor (not shown but connected in any desired way to drive the shaft 11). The motor is supplied with input motive power from any desired source (not shown) connected to it in well-known fashion.

In applying the invention to apparatus for encoding interference effects which constitute a measure of angular departures of one element relative to another, the driven elements, a rotor which turns relative to a pair of stator elements (not shown herein but described in detail in the parent application). One of the stator elements remains in fixed position at all times and the other is adjustable. The adjustable stator element is subject to being changed in its angular position relative to the rotor with the changes resulting from induced mechanical turnings of a controllable component, such as the conventionally represented control shaft 22 (FIG. 1). In each instance the rotor elements revolving internally of the stator elements provide output electrical waves of substantially sinusoidal form whose frequency is substantially identical, although the phase of the generated waves produced by the rotor-stator combination which is adjustable is subject to change relative to the reference frequency from the other wave-generating component. In this sense the phase may be advanced or retarded relative to the reference phase.

In practicing the invention the element whose angular state is to be determined is rotated (as indicated by the arrows in FIG. 1) to turn the shaft 22 and the movable stator. This introduces a phase change in the waveform available on conductor 55 as compared to that available on conductor 53. This change is then precisely determined.

It will be noted that for the purpose of indicating the fact that the variable phase generated wave may either be retarded or advanced with respect to the reference that the rotary transducer is shown as capable of revolving in either a clockwise or counter-clockwise direction, as designated by the arrows adjacent to the shaft 22 in FIG. 1. Output signal wave voltages provided on the conductors 53 and 55, the waveforms on the conductor 53 for reference purposes being considered as developed from the combination of the permanently fixed stator and those waveforms developed on the conductor 55 being considered to have been developed by the relative change between the rotor and the movable stator element, the relationships, of which are adjustable with respect to each other, as already explained. The frequency of the output voltages on conductors 53 and 55 may be chosen at any value desired, although it will be understood that the chosen generated frequency is determined by the number of separate pole pieces on the rotor and stator elements and the speed of rotation of the elements.

The oscillators 57 and 59 are not shown by circuit components since these are of any form well known in the art. One form of the oscillator which has proved quite satisfactory is the well-known Colpitts-type which provides extremely stable operation. The generated frequency is, however subject to control, as desired, in well-known fashion. The reference and variable phase output voltages are developed and available along the conductors 53 and 55 from which they are supplied to suitable phase detectors 61 and 63, the character of which is well known and need not be described herein in detail. Suffice it to say that the phase comparison of voltages is made between a sub-harmonic of the reference and variable master oscillator frequency as supplied to the phase detectors from frequency dividers 65 and 67 through conductors 69 and 71.

The frequency dividers 65 and 67 are of any well-known type suitable for providing a frequency division. In the illustrated case a frequency division of one thousand has proved satisfactory so that in the phase detectors 61 and 63 a phase comparison is made between the master control oscillator at its one-thousandth sub-harmonic and the developed generated frequency. The technique followed in this phase detector is essentially similar to that adopted in the well-known form of television circuitry wherein the so-called fly wheel type of synchronization is established. Any phase differences between the frequency of the waveform applied via the conductors 69 and 53 to the phase detector 61 or via the conductors 71 and 55 to phase detector 63 will then manifast themselves at a suitable control voltage available respectively on the conductors 73 and 75 which then may be supplied as a D.C. control voltage, for instance, which is fed back to control and adjust the frequency of the oscillators 57 and 59, respectively. This control may be provided in well-known manner, such as by applying the phase-detected voltage as a gain control signal for the usual form of reactance tube whose output controls the magnitude of either an inductive or capacitive component in the oscillatory circuit of the oscillators 57 or 59, depending upon which form of signal channel is to be selected. In this way an automatic frequency control loop is established between the oscillators 57 and 59 and the voltages developed on the conductors 53 and 55 through the action of the phase detectors 61 and 63, as the case may be.

Output voltages from the oscillators 57 and 59 comprising the master and variable control voltages occurring at a harmonic frequency of that developed by the transducer are also supplied by way of conductors 77 and 79 to a phase comparator and so-called up-down separator 81, which has been shown in block form in FIG. 1 but which circuitry is further outlined and described in the parent patent hereinabove identified. Suffice it for the purpose of this application to state that in the phase comparator and up-down separator 81 output signal voltages of general pulse characteristics are provided and appear on the output conductors 83 and 85 as pulses to be added or substracted in a reversible counter mechanism. The counters are shown conventionally by the counter components 86 and 87 which each comprise a plurality of separate indicator tubes and of which respectively and for illustrative purposes may be considered as representing degrees of phase shift by the counter 86 and tens, hundreds and thousands of degrees by the counter, schematically represented at 87 and thus forming a so-called vernier counter.

It is desirable to reset the vernier counter 87 to a zero state whenever absolute coincidence is achieved between the variable and reference phase signals at the assumed 1000:1 frequency dividers 65 and 67. The resetting is achieved under the control of the zero crossing coincidence detector conventionally shown at 89 in FIG. 3. In practice the signals serving to control the zero crossing coincident detector 89 are fed by way of the input conductors 90 and 91, these representing, illustratively, an input determined by the reference and variable phase oscillators 57 and 59 reduced in frequency by an order of 1000. The input signal supplied by way of the conductors is generally in pulse form and serves to provide a zero position indication once each cycle. The output signals from the zero crossing coincidence detectors 89 which control the vernier counter 87 then appear on the conductor 93.

Because of minor mechanical imperfections which are inherently present in mechanically driven devices, despite their manufacture to the limit of mechanical perfection, disturbances which will herein be termed "jitter" frequently arise. While various causes may bring these effects about, one cause often is that due to the rotor shaft running very slightly eccentric so that the amplitude of the generated output voltage waves at the reference and variable frequencies, as appears on the conductors 53 and 55, may vary very slightly. The variation can be in either or both amplitude and phase and even where this is an extremely low frequency change occurring over a long period of time it is sufficient to cause certain imperfections in the operation unless compensation is provided. It is impossible in general to provide mechanical compensation where the precision of manufacture of the transducer component is the greatest obtainable. Accordingly, this invention makes provision for introducing with the signal generating circuitry an electrical compensator to avoid the detrimental effects of mechanical power "jitter."

One form of circuitry to provide for compensating for such pertubations has been schematically represented and included in the block diagram illustration of FIG. 3 by the jitter corrector conventionally shown at 94 and 95. Input signals to the jitter correctors 94 and 95 are provided by way of conductors 96 and 97. Produced correction signals from the jitter-compensators 94 and 95 are then supplied by way of conductors 98 and 99, respectively, to the input of the oscillators 57 and 59.

The jitter corrector is shown and discussed in detail by making reference to FIG. 2 of the drawings. In the jitter compensator signal voltage is developed which is provided for the purpose of initiating a very minor phase modulation of the oscillator 57 or 59, as the case may be, in order to compensate the phase error in the control of the oscillator.

In the jitter compensation circuit shown by FIG. 2, voltage of one of the two developed reference or adjustable frequencies is supplied at the input terminal 101 and from there to the grid or control electrode 102 of a tube 103. The tube 103 has its plate or anode voltage supplied from a source (not shown) connected to the terminal point 105, the source being poled positively relative to the tube plate. The tube cathode 106 is connected to ground 137 through the cathode resistor 108.

An output voltage in phase with the input and fluctuating in amplitude in the same fashion as the input is obtained from the cathode follower and supplied through the coupling condenser 109 to the peak detector circuit which comprises the diodes 110 and 111 with resistor 112 connected across diode 110. This provides peak detection of the input amplitude fluctuations and the amplitude-varying signals are supplied through the integrating circuit provided by the capacitors 113 and 114 between which is the resistor 115 to be supplied for amplification to the input grid or control electrode 117 of the tube 118. There is thus provided, as the input voltage, fluctuations occurring at the rate of change of the input signal amplitude.

The electronic system here described is generally of limited sensitivity to amplitude but extremely sensitive to phase changes. The jitter circuit above described makes use of the fact that amplitude fluctuations are present through the amplitude detection of the envelope of the transducer output, which is put through a phase shifting and gain control circuit.

In the diagrammed circuit tube 118 is supplied with plate voltage from terminal 105 through plate resistor 119. Cathode bias is derived through cathode resistor 119'. Output voltage from the tube is available at both the tube plate and cathode or across resistor 119 and 119'. The voltages are then supplied to the conductors of a double-pole, double-throw switch 120 to be made available in an output conductor 98 either through capacitor 121 or resistor 122 and through resistor 123 and 124 to the latter of which the output coaxial conductor is adjustably connected.

As can be seen clearly from FIG. 2, the ouput available on the conductor 98 (or 99) is then applied as a control voltage to control the amplitude of the oscillator 57 (or 59 as the case may be). The control is applied as a modulation of the oscillator in well-known fashion and need not be explained in further detail.

Similar jitter compensation is provided for both the reference and variable channels and therefore a single unit is diagrammed but separate units are used in each channel as clearly shown by FIG. 2.

Many and varied modifications may be made to the circuitry here claimed and described. Therefore, it is believed that the claim hereinafter appended should be considered broadly and limited only insofar as prior art limitations necessitate it.

What is claimed is:

In an encoding system having a transducer means for generating recurring electrical signals for indicating a relative angular position, said signals being subject to phase and amplitude modulation caused by minor mechanical imperfections in said transducer, jitter circuit means for compensating for said modulation, said jitter circuit means comprising amplitude detecting means for detecting the amplitude variations of the envelope of said modulated signals, cathode follower amplifier means for coupling said modulated signals to said detecting means, means for integrating said detected envelope, and control means responsive to said integrated signal reaching a predetermined level for differentiating said integrated signal to provide a compensating signal which compensates for said phase and amplitude modulation; said control means comprising a cathode follower differentiating amplifier, double-pole, double-throw switching means for detecting the output from said differentiating amplifier, either from said cathode or from the plate of said amplifier, gain control means in series with the output of said differentiating amplifier for controlling the amplitude of said compensating signal, and resistor means in said differentiating circuit for controlling the phase of said compensating signal.

References Cited by the Examiner

UNITED STATES PATENTS

| | | | |
|---|---|---|---|
| 2,222,172 | 11/1940 | Dimmick | 328—150 X |
| 2,227,906 | 1/1941 | Kellog | 328—150 X |
| 2,410,000 | 10/1946 | Anderson | 325—323 X |
| 2,571,650 | 10/1951 | Atwood. | |
| 2,647,238 | 7/1953 | Bailey. | |
| 2,834,883 | 5/1958 | Lubokk | 328—151 |
| 2,924,769 | 2/1960 | Harriman et al. | 324—103 X |

ARTHUR GAUSS, *Primary Examiner.*

S. D. MILLER, *Assistant Examiner.*